US012280281B2

(12) United States Patent
Zabronsky

(10) Patent No.: US 12,280,281 B2
(45) **Date of Patent: *Apr. 22, 2025**

(54) NONFLUORINATED AGENT FOR LIQUID VEHICLE SYSTEMS

(71) Applicant: Tyco Fire Products LP, Cranston, RI (US)

(72) Inventor: Katherine L. Zabronsky, Marinette, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,288

(22) Filed: Mar. 27, 2024

(65) Prior Publication Data

US 2024/0226631 A1 Jul. 11, 2024

Related U.S. Application Data

(63) Continuation of application No. 18/458,574, filed on Aug. 30, 2023, now Pat. No. 12,097,396, which is a continuation of application No. 17/602,024, filed as application No. PCT/IB2020/053412 on Apr. 9, 2020, now Pat. No. 11,794,048.

(60) Provisional application No. 62/837,477, filed on Apr. 23, 2019.

(51) Int. Cl.

*A62D 1/00* (2006.01)
*A62C 99/00* (2010.01)
*A62D 1/02* (2006.01)

(52) U.S. Cl.

CPC ........ *A62D 1/0042* (2013.01); *A62C 99/0036* (2013.01); *A62D 1/0071* (2013.01)

(58) Field of Classification Search

None

See application file for complete search history.

(56) References Cited

U.S. PATENT DOCUMENTS 3,677,347 A 7/1972 Rosen et al.
4,090,967 A 5/1978 Falk
4,756,839 A 7/1988 Curzon et al.
5,091,097 A 2/1992 Pennartz
5,104,562 A 4/1992 Kardos et al.
5,207,932 A 5/1993 Norman et al.
5,401,871 A 3/1995 Feldmann-Krane et al.
5,616,273 A 4/1997 Clark et al.
5,676,876 A 10/1997 Winkler, III
5,945,025 A 8/1999 Cunningham
5,948,742 A 9/1999 Chang et al.
6,231,778 B1 * 5/2001 Hansen ................ A62D 1/0085 252/3
6,261,475 B1 7/2001 Hayes
6,416,684 B1 7/2002 Bloomer
6,638,444 B2 10/2003 Hayes
6,652,770 B2 11/2003 Hayes
6,659,123 B2 12/2003 Hyland et al.
6,983,614 B2 1/2006 Dick et al.
7,005,082 B2 2/2006 Clark
7,171,709 B2 2/2007 Weismiller
8,080,186 B1 12/2011 Pennartz
8,236,918 B2 8/2012 Mueh et al.
8,366,955 B2 * 2/2013 Thomas ............... A62D 1/0035 252/2
8,366,966 B2 2/2013 Yogev et al.
8,431,036 B2 4/2013 Mulligan et al.
9,446,272 B2 * 9/2016 Blunk .................. A62D 1/0071
9,662,522 B2 5/2017 Liu et al.
10,046,191 B1 * 8/2018 Hernandez ............... C09K 5/20
10,173,089 B2 1/2019 Xie
10,369,395 B2 8/2019 Bowen et al.
10,653,910 B2 5/2020 Da Costa et al.
10,780,305 B2 9/2020 Xie et al.
11,794,048 B2 * 10/2023 Zabronsky ......... A62C 99/0036
12,097,396 B2 * 9/2024 Zabronsky ........... A62D 1/0071
2003/0159836 A1 8/2003 Kashiki et al.
2005/0247907 A1 * 11/2005 Sapienza .................. C09K 3/18 106/13
2008/0115949 A1 * 5/2008 Li ...................... A62C 99/0072 169/44
2009/0145783 A1 6/2009 Forker
2011/0073795 A1 3/2011 Thomas et al.
(Continued)

FOREIGN PATENT DOCUMENTS

AU 2004249267 A 12/2004
CN 106377863 A 2/2017
(Continued)

OTHER PUBLICATIONS

CN 106377863 A (English Language Abstract) (Year: 2017).*
(Continued)

*Primary Examiner* — Joseph D Anthony

(74) *Attorney, Agent, or Firm* — Foley & Lardner LLP

(57) ABSTRACT

A firefighting composition for use in onboard firefighting systems of heavy industrial equipment, such as heavy vehicles and other types of heavy equipment used in construction, forestry, mining, and other similar industries, includes aqueous liquids that include (a) a sodium and/or potassium salt of an organic acid; (b) one or more of an alkylpolyglycoside surfactant, an alkyl sulfate anionic surfactant, an alkyliminodialkylcarboxylate surfactant and a zwitterionic surfactant; (c) an acetylenic diol derivative surfactant and/or a siloxane-based surfactant; and (d) alkylene glycol and/or glycerol.

19 Claims, No Drawings

(56) References Cited

U.S. PATENT DOCUMENTS

| | | | | |
|---|---|---|---|---|
| 2013/0207025 | A1* | 8/2013 | Sapienza | C09K 3/185<br>252/70 |
| 2014/0138105 | A1* | 5/2014 | Kuwatch | A62D 1/0042<br>252/2 |
| 2016/0001115 | A1* | 1/2016 | Blunk | A62D 1/00<br>252/3 |
| 2016/0152849 | A1* | 6/2016 | Nagai | B41J 2/1652<br>347/29 |
| 2016/0332013 | A1* | 11/2016 | Blunk | A62D 1/0071 |
| 2017/0203136 | A1 | 7/2017 | Blizzard et al. | |
| 2018/0345061 | A1 | 12/2018 | Hernandez et al. | |
| 2020/0164241 | A1 | 5/2020 | Xie et al. | |
| 2021/0146182 | A1 | 5/2021 | Hugener | |

FOREIGN PATENT DOCUMENTS

| | | | |
|---|---|---|---|
| CN | 108478978 | A * | 9/2018 |
| JP | 2003-135620 | A | 5/2003 |
| WO | WO-2012/154768 | A2 | 11/2012 |
| WO | WO-2017/161162 | A1 | 9/2017 |
| WO | WO-2018/124968 | A1 | 7/2018 |
| WO | WO-2020/077175 | A1 | 4/2020 |
| WO | WO-2020/217126 | A1 | 10/2020 |
| WO | WO-2021/191706 | A1 | 9/2021 |

OTHER PUBLICATIONS

ChemicalBook "Ethoxylated-2,5,8, 11-Tetramethyl-6-Dodecyn-5,8-Diol" 2017 (retrieved on 13 3, 5/Jun. 3, 2020). Retrieved from the internet at URL: <https://www.chemicalbook.com/ChemicalProductProperty_EN_CB21020515.htm>; p. 1.

International Search Report and Written Opinion for International Application No. PCT/IB2020/053412, mail date Jul. 1, 2020, 15 pages.

International Search Report and Written opinion on PCT Appl. Ser. No. PCT/IB2022/059964 dated Feb. 1, 2023 (10 pages).

Orsavovaj, et al. "Fatty Acids Composition of Vegetable Olis and Its Contribution to Dietary Energy Intake and Dependence of Cardiovascular Mortality on Dietary Intake of Fatty Acids" Int. J. Mol. Sci. 2015, vol. 16, pp. 12871-12890; table 1.

* cited by examiner

NONFLUORINATED AGENT FOR LIQUID VEHICLE SYSTEMS

CROSS-REFERENCE TO RELATED APPLICATIONS

This application is a continuation of U.S. patent application Ser. No. 18/458,574, filed on Aug. 30, 2023, which is a continuation of U.S. patent application Ser. No. 17/602,024, filed on Oct. 7, 2021, which is a U.S. National Stage Application of PCT/IB2020/053412, filed Apr. 9, 2020, which claims the benefit of priority to U.S. Provisional Application No. 62/837,477, filed Apr. 23, 2019, the contents of which are incorporated herein by reference in their entirety.

BACKGROUND

Valuable heavy industrial equipment, such as off-road vehicles and other types of heavy equipment used in construction, forestry, mining, and other industries, is used throughout the world. Such heavy industrial equipment can be used in remote and/or difficult to access areas. Such off-road industrial vehicles often include onboard firefighting systems to protect the vehicle and the operator. The onboard firefighting systems include a firefighting agent, such as a dry chemical agent or a wet chemical agent. An exemplary wet chemical agent includes an aqueous film-forming foam (AFFF) composition that can be aerosolized to produce a firefighting foam to fight fires. The valuable heavy industrial equipment can be used in environments having high or low temperatures and other harsh environmental conditions. Therefore, the firefighting agent used in the onboard firefighting systems of such equipment is desirably stable under the high or low temperatures and harsh environmental conditions in which the valuable heavy industrial equipment can be used. For example, in regions in which the high value industrial equipment is below a freezing point of water, it is important to deploy foam-forming firefighting compositions that remain liquid for prolonged time periods under low temperature conditions.

The onboard firefighting systems of valuable heavy industrial equipment are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons and are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions commonly include fluorinated and perfluorinated surfactants. Environmental concerns related to fluorinated and perfluorinated surfactants have developed. As a result, there is a strong desire in the marketplace to replace fluorinated and perfluorinated firefighting products with non-fluorinated products. There is therefore a continuing need to produce fluorine-free AFFF firefighting compositions that can be deployed in onboard firefighting systems of heavy industrial equipment.

SUMMARY

The present application relates generally to firefighting compositions that may be used in onboard firefighting systems of heavy industrial equipment, such as heavy vehicles and other types of heavy equipment used in construction, forestry, mining, and other similar industries, that are used throughout the world. The firefighting compositions of the present disclosure are aqueous liquid firefighting compositions that are provided as use-strength compositions. As used herein, the phrase “use-strength composition” means a composition that does not need to be diluted before being deployed to fight a fire. The firefighting compositions described herein are aqueous film-forming foam (AFFF) compositions that can be aerosolized by one or more components of the onboard firefighting system (e.g., a nozzle) to produce a firefighting foam to fight fires. Since the valuable heavy industrial vehicles can be used in environments having high or low temperatures and/or other harsh environmental conditions, the firefighting composition used in the onboard firefighting system may be designed to be storage stable under the high or low temperatures and harsh conditions in which the valuable heavy industrial equipment can be used. For example, in regions in which the valuable heavy industrial equipment is below a freezing point of water, it is important to deploy firefighting compositions that remain liquid for prolonged time periods under low temperature conditions below the freezing point of water. In some embodiments, such firefighting compositions are flowable at temperatures lower than −30° C. As used herein, “flowable” means that a viscosity of the firefighting composition is low enough that the firefighting composition can flow from a storage tank to a dispensing mechanism (e.g., a nozzle, etc.) of the onboard vehicle firefighting system, e.g., typically having a viscosity of no more than about 100 cP at the use temperature.

An exemplary embodiment is related to an aqueous firefighting composition that includes a) about 20-40 wt. % of a sodium and/or potassium salt of an organic acid, b) one or more of an alkylpolyglycoside surfactant, an alkyl sulfate anionic surfactant, an alkyliminodialkylcarboxylate surfactant and an alkylamidoalkylene zwitterionic surfactant, c) an acetylenic diol derivative surfactant and/or a siloxane-based surfactant, d) about 5-20 wt. % alkylene glycol and/or glycerol, and e) at least about 30 wt. % water. In some embodiments, such compositions are substantially free of any fluorinated additives and may desirably be produced such that the firefighting composition has a total concentration of fluorine atoms on a weight percentage basis of no more than about 1 part per million (ppm) F and often has a substantially lower total fluorine concentration.

Another exemplary embodiment is related to an aqueous firefighting composition that includes a) about 20-50 wt. % of a sodium and/or potassium salt of an organic acid, b) a surfactant mixture containing one or more of an alkylpolyglycoside surfactant, an alkyl sulfate anionic surfactant, an alkyliminodialkylcarboxylate surfactant and a zwitterionic surfactant, c) an acetylenic diol derivative surfactant and/or a siloxane-based surfactant, d) about 2-25 wt. % alkylene glycol and/or glycerol, and e) at least about 40 wt. % water. In some embodiments, such compositions are substantially free of any fluorinated additives and may desirably be produced such that the firefighting composition has a total concentration of fluorine atoms on a weight percentage basis of no more than about 1 part per million (ppm) F and often has a substantially lower total fluorine concentration.

DETAILED DESCRIPTION

The present application provides aqueous firefighting compositions for use in onboard firefighting system of heavy industrial equipment, such as heavy vehicles and other types of heavy equipment used in construction, forestry, mining, and other industries, that are used throughout the world. The firefighting compositions of the present disclosure are aqueous liquid firefighting compositions that may be used as use-strength compositions. As used herein, the phrase "use-strength composition" means a composition that does not need to be diluted before being deployed to fight a fire. The firefighting compositions described herein are aqueous film-forming foam (AFFF) compositions that can be aerosolized by one or more components of the onboard firefighting system (e.g., a nozzle) to generate a firefighting foam. Since the off-road industrial vehicles are often used in harsh environments having high or low temperatures, the firefighting composition used in the onboard firefighting system is stable under the high or low temperatures and harsh conditions in which the off-road industrial vehicles can be used. For example, in regions in which the high value off-road mining equipment is in high temperature environments, the firefighting composition is stable for temperatures up to 60° C. In another example, in regions in which the high value off-road mining equipment is in low temperature environments below the freezing point of water, it is important to deploy firefighting compositions that remain liquid for prolonged time periods under low temperature conditions. In some embodiments, such firefighting compositions are flowable at temperatures below −30° C. As used herein, "flowable" means that a viscosity of the firefighting composition is low enough that the firefighting composition can flow from a storage tank to a dispensing mechanism (e.g., a nozzle, etc.) of the onboard vehicle firefighting system, e.g., typically having a viscosity that is no more than about 100 cP at the low use temperature.

The aqueous firefighting compositions of the present disclosure are commonly substantially free of any fluorinated additives. As used herein, the "phrase substantially free of fluorinated additives" means that the aqueous firefighting composition includes no more than 0.01 wt. % of fluorinated additives. In some embodiments, the aqueous firefighting composition includes no more than 0.005 wt. % of fluorinated additives. The aqueous firefighting compositions of the present disclosure are substantially free of fluorine. As used herein, the phrase "substantially free of fluorine" means that the composition has a total concentration of fluorine atoms on a weight percentage basis of no more than about 1 part per million (ppm) F. The aqueous firefighting compositions of the present disclosure preferably include substantially less than 1 ppm F.

In one aspect, the aqueous firefighting compositions of the present disclosure include a) a sodium and/or potassium salt of an organic acid, b) one or more of an alkylpolyglycoside surfactant, an alkyl sulfate anionic surfactant, an alkyliminodialkylcarboxylate surfactant and an alkylamidoalkylene zwitterionic surfactant, c) an acetylenic diol derivative surfactant and/or a siloxane-based surfactant, and d) alkylene glycol and/or glycerol, and e) water.

The aqueous firefighting compositions commonly include about 20-40 wt. % of the sodium and/or potassium salt of one or more organic acids. Where the composition includes a mixture of such sodium and potassium salts, the concentration of the organic acid(s) sodium salt may be less than about 20 wt. % of the composition and the concentration of the organic acid(s) potassium salt may be less than about 20 wt. % of the composition, but the total concentration of the organic acid(s) sodium and potassium salts constitutes about 20-40 wt. % of the composition. The sodium and/or potassium salt of the organic acid(s) may suitably include potassium acetate, potassium formate, potassium propionate, potassium butyrate, potassium lactate, potassium citrate, sodium acetate, sodium lactate, sodium oxalate, potassium oxalate, sodium citrate, potassium tartrate, sodium tartrate, potassium bitartrate, sodium bitartrate or a mixture of two or more thereof.

The potassium salt of the organic acid may include potassium acetate, potassium formate, potassium propionate, potassium butyrate, potassium lactate, potassium citrate, potassium oxalate, potassium tartrate, potassium bitartrate or a mixture of two or more thereof. In some embodiments, the potassium salt of the organic acid may include potassium acetate, potassium formate, potassium lactate, or a mixture of two or more thereof. In some embodiments, the potassium salt of the organic acid includes potassium acetate. In some embodiments, the potassium salt of the organic acid includes potassium lactate. In embodiments that include the potassium salt of the organic acid, the aqueous firefighting composition typically includes about 20-50 wt. % of the potassium salt of the organic acid. In some embodiments, the aqueous firefighting composition includes about 25-30 wt. % of the potassium salt of the organic acid. In such embodiments, the potassium salt of the organic acid may typically include potassium acetate, potassium formate, potassium lactate, or a mixture of two or more thereof. In some embodiments, the aqueous firefighting composition may include about 25-30 wt. % of potassium acetate, commonly about 27-35 wt. % potassium acetate. In some embodiments, the aqueous firefighting composition includes about 30-35 wt. % of potassium acetate and/or potassium lactate. In some embodiments, the aqueous firefighting composition may include about 40-50 wt. % of the potassium salt of the organic acid, such as one or more of potassium acetate, potassium lactate, and potassium formate.

The sodium salt of the organic acid may include sodium acetate, sodium lactate, sodium oxalate, sodium citrate, sodium tartrate, sodium bitartrate, or a mixture thereof. In embodiments that include the sodium salt of the organic acid, the aqueous firefighting composition may include about 20-40 wt. % of the sodium salt of the organic acid.

As discussed above, the aqueous firefighting composition includes surfactants, such as an alkylpolyglycoside surfactant, an alkyl sulfate anionic surfactant, an alkyliminodialkylcarboxylate surfactant, an alkylamidoalkylene zwitterionic surfactant, or a mixture of two or more thereof. In some embodiments, the aqueous firefighting composition includes about 0.5-5 wt. % of such a surfactant mixture. The surfactant mixture may suitably include an alkylpolyglycoside surfactant, a $C_{8-12}$-alkyl sulfate salt, a $C_{10-14}$-alkyliminodipropionate salt, a $C_{8-18}$-alkylamidopropyl hydroxysultaine surfactant and an ethoxylated acetylenic diol surfactant. In other embodiments, the surfactant mixture may suitably include an alkylpolyglycoside surfactant, a $C_{8-12}$-alkyl sulfate salt, a $C_{10-14}$-alkyliminodipropionate salt, a $C_{8-18}$-alkylamidopropyl hydroxysultaine surfactant and siloxane-based surfactant.

The alkylpolyglycoside surfactant typically includes a $C_{8-12}$-alkylpolyglycoside and/or an alkylpolyglucoside. Suitable examples of the $C_{8-12}$-alkylpolyglycoside include a $C_{8-16}$-alkylpolyglycoside having an average degree of polymerization of about 1.3-2.0. Suitable examples of the alkylpolyglycoside include a $C_{9-11}$-alkylpolyglucoside, such as a $C_{9-11}$-alkylpolyglucoside having an average degree of polymerization of about 1.4-1.7. Commonly, the $C_{9-11}$-alkylpolyglucoside includes a nonyl, decyl and/or an undecyl polyglucoside. In embodiments that include the alkylpolyglycoside surfactant, the aqueous firefighting composition typically includes about 0.2-3 wt. % of the alkylpolyglycoside surfactant, commonly about 0.5 to 1.5 wt. % of the alkylpolyglycoside surfactant, and often about 0.5 to 1.0 wt. % of the alkylpolyglycoside surfactant.

The alkyl sulfate anionic surfactant typically includes include a $C_{8-12}$-alkyl sulfate salt. Suitable examples of the $C_{8-12}$-alkyl sulfate salt include a dodecyl sulfate salt, a decyl sulfate salt an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In embodiments that include the alkyl sulfate anionic surfactant, the aqueous firefighting composition typically includes about 0.05-1 wt. % of the alkyl sulfate anionic surfactant.

The alkyliminodialkylcarboxylate surfactant typically includes include a $C_{10-14}$-alkyliminodipropionate salt. Suitable examples of the $C_{10-14}$-alkyliminodipropionate salt include a lauryliminodipropionate salt, a myristyliminodipropionate salt, a capryliminodipropionate salt, or a combination of any two or more thereof. In some embodiments, the alkyliminodialkylcarboxylate surfactant may include a lauryliminodipropionate sodium salt. In embodiments that include the alkyliminodialkylcarboxylate surfactant, the aqueous firefighting composition typically includes about 0.05-1 wt. % of the alkyliminodialkylcarboxylate surfactant.

The alkylamidoalkylene zwitterionic surfactant typically includes an alkylamidoalkylene hydroxysultaine surfactant, an alkylamidoalkylene betaine surfactant and/or an alkyl betaine surfactant. Suitable examples of the alkylamidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the alkylamidoalkylene betaine surfactant include a $C_{8-18}$-alkylamidoalkyl betaine surfactant, such as a cocamidopropyl betaine, a tallowamidopropyl betaine, a laurylamidopropyl betaine or a myristylamidopropyl betaine. In some embodiments, the alkylamidoalkylene zwitterionic surfactant typically may include an alkylamidoalkyl hydroxysultaine surfactant, such as a $C_{8-18}$-alkylamidopropyl hydroxysultaine surfactant, e.g., a cocamidopropyl hydroxysultaine surfactant. In embodiments that include the alkylamidoalkylene zwitterionic surfactant, the aqueous firefighting composition may include about 0.05-1 wt. % of the alkylamidoalkylene zwitterionic surfactant, commonly about 0.2-1 wt. % of an alkylamidoalkylene zwitterionic surfactant. In embodiments that include the alkylamidoalkylene zwitterionic surfactant, the aqueous firefighting composition may include about 0.05-1 wt. % of an alkylamidoalkyl hydroxysultaine surfactant.

In some embodiments, the aqueous firefighting composition may include a surfactant mixture containing one or more of an alkylpolyglycoside surfactant, an alkyl sulfate anionic surfactant, an alkyliminodialkylcarboxylate surfactant and a zwitterionic surfactant. The surfactant mixture may include one or more surfactants selected from $C_{8-12}$-alkylpolyglycosides, $C_{12-20}$-alkyl sulfate salts, $C_{10-14}$-alkyliminodipropionate salts, $C_{8-18}$-alkylamidopropyl hydroxysultaine surfactants, $C_{8-18}$-alkylamidoalkyl betaine surfactants, $C_{8-18}$-alkyl betaine surfactants and $C_{8-12}$-alkylpolyglycosides. In some embodiments, the aqueous firefighting composition typically includes about 0.5-5 wt. % of such a surfactant mixture.

As discussed above, the aqueous firefighting composition typically includes an acetylenic diol derivative surfactant and/or a siloxane-based surfactant. Suitable examples of the acetylenic diol derivative surfactant include alkoxylated acetylenic diols. An exemplary alkoxylated acetylenic diol is an ethoxylated acetylenic diol. The alkoxylated acetylenic diol may include alkoxylated 2,5,8,11-tetramethyl-6-dodecyn-5,8 diol, alkoxylated 2,4,7,9-tetramethyl-5-decyne-4,7-diol, or mixtures thereof. The alkoxylated acetylenic diol may include ethoxylated 2,5,8,11-tetramethyl-6-dodecyn-5,8 diol, ethoxylated 2,4,7,9-tetramethyl-5-decyne-4,7-diol, or mixtures thereof. Non-limiting examples of the acetylenic diol derivative surfactant include Surfynol® 440 and Surfynol® 465 (commercially available from Evonik), both of which are ethoxylated 2,4,7,9-tetramethyl-5-decyne-4,7-diol. Another non-limiting example of the acetylenic diol derivative surfactant includes Surfynol® 2502 (commercially available from Evonik), which is an ethylene oxide-propylene oxide copolymer diether with 2,4,7,9-tetramethyl-5-decyne-4,7-diol. Other non-limiting examples of the acetylenic diol derivative surfactant include Dynol™ 800 and Dynol™ 810 surfactants (commercially available from Evonik), both of which are ethoxylated 2,5,8,11-tetramethyl-6-dodecyn-5,8 diols. In embodiments that include the acetylenic diol derivative surfactant, the aqueous firefighting composition typically includes about 0.1-2 wt. % of the acetylenic diol derivative surfactant, commonly 0.1-1 wt. % of the acetylenic diol derivative surfactant, and often 0.2 to 0.6 wt. % of the acetylenic diol derivative surfactant.

The siloxane-based surfactant includes siloxane-based and/or polyether-siloxane-based surfactants. Suitable examples of a siloxane-based surfactant include Dynol™ 960 and Dynol™ 980 surfactants. A suitable example of a polyether siloxane surfactant includes Tegopren® 5847 (commercially available from Evonik). In embodiments that include the siloxane-based and/or the polyether-siloxane-based surfactant, the aqueous firefighting composition typically includes a total of about 0.1-2 wt. % of the siloxane-based surfactant and/or the polyether-siloxane-based surfactant.

As discussed above, the aqueous firefighting composition includes alkylene glycol and/or glycerol. The alkylene glycol typically includes propylene glycol and/or ethylene glycol. In some embodiments, the present fire-fighting composition includes a mixture of alkylene glycol and glycerol. Such mixtures of alkylene glycol and glycerol typically include the alkylene glycol and glycerol in a weight ratio of about 0.1:1 to 5:1. In some embodiments, the mixture of alkylene glycol and glycerol is a mixture of ethylene glycol and glycerol. In some embodiments, the mixture of alkylene glycol and glycerol is a mixture of propylene glycol and glycerol. The aqueous firefighting composition typically includes a total of about 2-25 wt. % and in some instances, about 2 to 10 wt. % alkylene glycol and/or glycerol, about 5 to 30 wt. % alkylene glycol and/or glycerol, about 8-25 wt. % alkylene glycol and/or glycerol, about 8-20 wt. % alkylene glycol and/or glycerol, or about 10-20 wt. % alkylene glycol and/or glycerol.

As discussed above, the aqueous firefighting composition includes water. In some embodiments, the water is water from a municipal water source (e.g., tap water). In some embodiments, the water is a purified water, such as purified water that meets the standards set forth in the United States Pharmacopeia, which is incorporated by reference herein, in relevant part. In some embodiments, the aqueous firefighting composition includes at least about 30 wt. % water. In some embodiments, the aqueous firefighting composition includes at least about 40 wt. % water. In some embodiments, the aqueous firefighting composition includes at least about 45 wt. % water. In some embodiments, the aqueous firefighting composition includes at least about 50 wt. % water. In some embodiments, the aqueous firefighting composition includes about 45-55 wt. % water. In some embodiments, the aqueous firefighting composition includes about 40-50 wt. % water. In some embodiments, the aqueous firefighting composition may be produced using a source of water that has a total concentration of fluorine atoms on a weight percentage basis of no more than about 1 ppm F.

The table below provides an illustration of suitable formulations of the present firefighting compositions designed for use as film forming foam agents in firefighting systems installed on large high value vehicles, such as large off road mining equipment.

| COMPONENT | Formula A | Formula B |
|---|---|---|
| Water | ≥30 wt. % | 45-55 wt. % |
| Tolyltriazole | 0.01-0.1 wt. % | |
| Dowacide A (antimicrobial) | | |
| Propylene glycol | 1-10 wt. % | 3-15 wt. % |
| Glycerol | 1-10 wt. % | 3-15 wt. % |
| Total glycol + glycerol | 2-25 wt. % | 5-25 wt. % |
| Alkyliminodipropionate salt | 0.05-1 wt. % | |
| Alkylpolyglycoside | 0.2-3 wt. % | 0.2-3 wt. % |
| Sodium Alkyl Sulfate | 0.05-1 wt. % | 0.05-1 wt. % |
| Cocamidopropyl Hydroxysultaine | 0.05-1 wt. % | 0.05-1 wt. % |
| Siloxane-based Surfactant and/or Ethoxylated acetylenic diol | 0.1-2 wt. % | 0.1-2 wt. % |
| Potassium acetate and/or Potassium lactate and/or Potassium Formate | 20-50 wt. % | 20-40 wt. % |
| TOTAL | 100 | 100 |

The aqueous firefighting compositions of the present disclosure may be substantially free of any fluorinated additives. As used herein, the "phrase substantially free of fluorinated additives" means that the aqueous firefighting composition includes no more than 0.01 wt. % of fluorinated additives. In some embodiments, the aqueous firefighting composition includes no more than 0.005 wt. % of fluorinated additives. The aqueous firefighting compositions of the present disclosure may be substantially free of fluorine in any form. As used herein, the phrase "substantially free of fluorine" means that the aqueous firefighting composition has a total concentration of fluorine atoms on a weight percentage basis of no more than about 1 ppm F.

In some embodiments, the aqueous firefighting composition can include additional components. For example, the aqueous firefighting composition may also include one or more corrosion inhibitors. An exemplary corrosion inhibitor includes a triazole corrosion inhibitor, such as tolyltriazole. In embodiments that include tolyltriazole, the aqueous firefighting composition may include about 0.005-0.1 wt. % tolyltriazole. In some instances, the aqueous firefighting composition may include magnesium sulfate. In embodiments that include magnesium sulfate, the aqueous firefighting composition suitably includes about 0.1-1 wt. % magnesium sulfate.

EXAMPLES

The following examples more specifically illustrate formulations for preparing aqueous firefighting compositions according to various embodiments described above. These examples should in no way be construed as limiting the scope of the present technology.

Tables 1-7 below show the composition of a number of exemplary formulations of the present aqueous firefighting foam composition. The amounts shown in Tables 1-7 represent the weight percentage of the particular component, added in its commercially available form, based on the total weight of the composition. Where appropriate, the weight percentage of active component in the commercial form of the product is shown in parentheses, e.g., for a number of the surfactants which are available as aqueous solutions. The formulations include a sodium and/or potassium salt of an organic acid; an alkylpolyglycoside surfactant; an alkyl sulfate anionic surfactant; an alkyliminodialkylcarboxylate surfactant; an alkylamidoalkylene zwitterionic surfactant; an acetylenic diol derivative surfactant and/or a siloxane-based surfactant; alkylene glycol and/or glycerol; and water.

TABLE 1

| COMPONENTS | Formula A | Formula B | Formula C | Formula D | Formula E | Formula F |
|---|---|---|---|---|---|---|
| Water | 21.6 | 18.9 | 28.5 | 38.5 | 27.5 | 27.5 |
| Tolyltriazole | 0.01 | 0 | 0.04 | 0.04 | 0.04 | 0.04 |
| Magnesium sulfate | 0.24 | 0 | 0 | 0 | 0 | 0 |
| Ethylene glycol (95 wt. %) | 0 | 0 | 0 | 0 | 13 | 6 |
| Propylene glycol | 17 | 13 | 13 | 13 | 0 | 0 |
| Glycerol | 0 | 0 | 0 | 0 | 0 | 8 |
| Sodium Lauriminodipropionate (~30 wt. % solution) | 0.49 | 0.24 | 0.73 | 0.73 | 0.73 | 0.73 |
| Alkylpolyglycoside (~50 wt. % solution) | 3 | 1.5 | 1.5 | 1.5 | 1.5 | 1.5 |
| Sodium Decyl Sulfate (~37 wt. % solution) | 0.9 | 0.45 | 0.45 | 0.45 | 0.45 | 0 |
| Sodium Octyl Sulfate (~33 wt. % solution) | 0 | 0 | 0 | 0 | 0 | 0.45 |
| Cocamidopropyl Hydroxysultaine (~50 wt. % solution) | 0.26 | 0.13 | 0.39 | 0.39 | 0.39 | 0.39 |
| Siloxane-based Surfactant | 1.5 | 0.75 | 0 | 0.4 | 0.4 | 0.4 |
| Ethoxylated acetylenic diol | 0 | 0 | 0 | 0 | 0 | 0 |

TABLE 1-continued

| COMPONENTS | Formula A | Formula B | Formula C | Formula D | Formula E | Formula F |
|---|---|---|---|---|---|---|
| Polyether siloxane surfactant | 0 | 0 | 0.4 | 0 | 0 | 0 |
| Potassium acetate (60 wt. % solution) | 0 | 65 | 55 | 45 | 55 | 55 |
| Potassium-L(+)-lactate (60 wt. % solution) | 55 | 0 | 0 | 0 | 0 | 0 |
| TOTAL | 100 | 100 | 100 | 100 | 100 | 100 |

TABLE 2

| COMPONENTS | Formula G | Formula H | Formula I | Formula J | Formula K | Formula L |
|---|---|---|---|---|---|---|
| Water | 27.5 | 39.5 | 29.6 | 39.5 | 29.5 | 35.5 |
| Tolyltriazole | 0.04 | 0.04 | 0.04 | 0.04 | 0.04 | 0.04 |
| Magnesium sulfate | 0 | 0 | 0 | 0 | 0 | 0 |
| Ethylene glycol (95 wt. %) | 0 | 0 | 7 | 0 | 0 | 0 |
| Propylene glycol | 14 | 6 | 8 | 4 | 6 | 6 |
| Glycerol | 0 | 6 | 0 | 8 | 6 | 10 |
| Sodium Lauriminodipropionate (~30 wt. % solution) | 0.73 | 0.73 | 0.49 | 0.73 | 0.73 | 0.73 |
| Alkylpolyglycoside (~50 wt. % solution) | 1.5 | 1.5 | 3 | 1.5 | 1.5 | 1.5 |
| Sodium Decyl Sulfate (~37 wt. % solution) | 0 | 0.45 | 0.9 | 0.45 | 0.45 | 0.45 |
| Sodium Octyl Sulfate (~33 wt. % solution) | 0.45 | 0 | 0 | 0 | 0 | 0 |
| Cocamidopropyl Hydroxysultaine (~50 wt. % solution) | 0.39 | 0.39 | 0.25 | 0.39 | 0.39 | 0.39 |
| Siloxane-based Surfactant | 0.4 | 0 | 0.5 | 0 | 0 | 0 |
| Ethoxylated acetylenic diol | 0 | 0.4 | 0 | 0.4 | 0.4 | 0.4 |
| Polyether siloxane surfactant | 0 | 0 | 0 | 0 | 0 | 0 |
| Potassium acetate (60 wt. % solution) | 55 | 45 | 0 | 45 | 55 | 45 |
| Potassium-L(+)-lactate (60 wt. % solution) | 0 | 0 | 50 | 0 | 0 | 0 |
| TOTAL | 100 | 100 | 100 | 100 | 100 | 100 |

TABLE 3

| COMPONENTS | Formula M | Formula N | Formula O | Formula P | Formula Q | Formula R |
|---|---|---|---|---|---|---|
| Water | 27.5 | 27.5 | 33.5 | 32.5 | 33.5 | 39.38 |
| Tolyltriazole | 0.04 | 0.04 | 0.04 | 0.04 | 0.04 | 0.04 |
| Magnesium sulfate | 0 | 0 | 0 | 0 | 0 | 0 |
| Ethylene glycol (95 wt. %) | 6 | 6 | 0 | 0 | 0 | 0 |
| Propylene glycol | 0 | 0 | 9 | 7 | 0 | 6 |
| Glycerol | 7 | 8 | 9 | 7 | 13 | 6 |
| Sodium Lauriminodipropionate (~30 wt. % solution) | 0.73 | 0.73 | 0.73 | 0.73 | 0.75 | 0.73 |
| Alkylpolyglycoside (~50 wt. % solution) | 1.5 | 1.5 | 1.5 | 1.5 | 1.5 | 1.5 |
| Sodium Decyl Sulfate (~37 wt. % solution) | 0.45 | 0 | 0.45 | 0.45 | 0.4 | 0.45 |
| Sodium Octyl Sulfate (~33 wt. % solution) | 0 | 0.45 | 0 | 0 | 0 | 0 |

TABLE 3-continued

| COMPONENTS | Formula M | Formula N | Formula O | Formula P | Formula Q | Formula R |
|---|---|---|---|---|---|---|
| Cocamidopropyl Hydroxysultaine (~50 wt. % solution) | 0.39 | 0.39 | 0.39 | 0.39 | 0.4 | 0.40 |
| Siloxane-based Surfactant | 0 | 0.4 | 0 | 0 | 0 | 0 |
| Ethoxylated acetylenic diol | 0 | 0 | 0.4 | 0.4 | 0.4 | 0.40 |
| Polyether siloxane surfactant | 0.4 | 0 | 0 | 0 | 0 | 0 |
| Potassium acetate (60 wt. % solution) | 0 | 55 | 45 | 50 | 40 | 45 |
| Potassium-L(+)-lactate (60 wt. % solution) | 55.0 | 0 | 0 | 0 | 0 | 0 |
| TOTAL | 100 | 100 | 100 | 100 | 100 | 100 |

TABLE 4

| COMPONENTS | Formula I | Formula II | Formula III | Formula IV | Formula V | Formula VI |
|---|---|---|---|---|---|---|
| Water | 29.38 | 25.83 | 25.70 | 25.83 | 26.23 | 26.8 |
| Tolyltriazole | 0.04 | 0.04 | 0.04 | 0.04 | 0.04 | 0.04 |
| Dowicide A | 0.03 | 0.03 | 0.03 | 0.03 | 0.03 | 0.03 |
| Magnesium sulfate | 0 | 0 | 0.13 | 0 | 0 | 0 |
| Propylene glycol | 6 | 8 | 8 | 8 | 8 | 10 |
| Glycerol | 6 | 8 | 8 | 8 | 8 | 10 |
| Sodium Lauriminodipropionate (~30 wt. % solution) | 0 | 0 | 0 | 0 | 0 | 0 |
| Lauramidopropyl Betaine (~35 wt. % solution) | 0 | 0 | 0 | 0 | 0 | 0.73 |
| Alkylpolyglycoside (~50 wt. % solution) | 1.5 | 1.5 | 1.5 | 1.5 | 1.2 | 1.5 |
| Sodium Decyl Sulfate (~37 wt. % solution) | 0 | 0.2 | 0.2 | 0 | 0.2 | 0 |
| Sodium Octyl Sulfate (~33 wt. % solution) | 0 | 0 | 0 | 0.2 | 0 | 0 |
| Octyl Betaine (~40 wt. % solution) | 0.45 | 0 | 0 | 0 | 0 | 0 |
| Cocamidopropyl Hydroxysultaine (~50 wt. % solution) | 1.2 | 1 | 1 | 1 | 1 | 0.5 |
| Ethoxylated acetylenic diol | 0.4 | 0.4 | 0.4 | 0.4 | 0.3 | 0.4 |
| Potassium acetate (60 wt. % solution) | 55 | 55 | 55 | 55 | 55 | 50 |
| TOTAL | 100 | 100 | 100 | 100 | 100 | 100 |
| Freeze Protection (Flowable at or below) | −45° C. | −50° C. | −50° C. | −50° C. | −50° C. | −50° C. |

TABLE 5

| COMPONENTS | Formula VII | Formula VIII | Formula IX | Formula X | Formula XI | Formula XII |
|---|---|---|---|---|---|---|
| Water | 26.8 | 27.35 | 26.83 | 29.83 | 30.83 | 30.83 |
| Tolyltriazole | 0.04 | 0.04 | 0.04 | 0.04 | 0.04 | 0.04 |
| Dowicide A | 0.03 | 0.03 | 0.03 | 0.03 | 0.03 | 0.03 |
| Magnesium sulfate | 0 | 0 | 0 | 0 | 0 | 0 |
| Propylene glycol | 10 | 12 | 10 | 6 | 8 | 12 |
| Glycerol | 10 | 12 | 10 | 6 | 8 | 4 |
| Sodium Lauriminodipropionate (~30 wt. % solution) | 0.73 | 0 | 0 | 0 | 0 | 0 |
| Lauramidopropyl Betaine (~35 wt. % solution) | 0 | 0.73 | 0 | 0 | 0 | 0 |
| Alkylpolyglycoside (~50 wt. % solution) | 1.5 | 1.5 | 1.5 | 1.5 | 1.5 | 1.5 |

TABLE 5-continued

| COMPONENTS | Formula VII | Formula VIII | Formula IX | Formula X | Formula XI | Formula XII |
|---|---|---|---|---|---|---|
| Sodium Decyl Sulfate (~37 wt. % solution) | 0 | 0 | 0.2 | 0.2 | 0.2 | 0.2 |
| Sodium Octyl Sulfate (~33 wt. % solution) | 0 | 0 | 0 | 0 | 0 | 0 |
| Octyl Betaine (~40 wt. % solution) | 0 | 0.45 | 0 | 0 | 0 | 0 |
| Cocamidopropyl Hydroxysultaine (~50 wt. % solution) | 0.5 | 0.5 | 1 | 1 | 1 | 1 |
| Ethoxylated acetylenic diol | 0.4 | 0.4 | 0.4 | 0.4 | 0.4 | 0.4 |
| Potassium acetate (60 wt. % solution) | 50 | 45 | 50 | 55 | 50 | 50 |
| TOTAL | 100 | 100 | 100 | 100 | 100 | 100 |
| Freeze Protection (Flowable at or below) | −50° C. | −50° C. | −50° C. | −45° C. | −45° C. | −45° C. |

TABLE 6

| COMPONENTS | Formula XIII | Formula XIV |
|---|---|---|
| Water | 27.83 | 27.83 |
| Tolyltriazole | 0.04 | 0.04 |
| Dowicide A | 0.03 | 0.03 |
| Magnesium sulfate | 0 | 0 |
| Propylene glycol | 8 | 6 |
| Glycerol | 8 | 6 |
| Sodium Lauriminodipropionate (~30 wt. % solution) | 0 | 0 |
| Lauramidopropyl Betaine (~35 wt. % solution) | 0 | 0 |
| Alkylpolyglycoside (~50 wt. % solution) | 1.5 | 1.5 |
| Sodium Decyl Sulfate (~37 wt. % solution) | 0.20 | 0.2 |
| Sodium Octyl Sulfate (~33 wt. % solution) | 0 | 0 |
| Octyl Betaine (~40 wt. % solution) | 0 | 0 |
| Cocamidopropyl Hydroxysultaine (~50 wt. % solution) | 1 | 1 |
| Ethoxylated acetylenic diol | 0.4 | 0.4 |
| Potassium acetate (60 wt. % solution) | 53 | 57 |
| TOTAL | 100 | 100 |
| Freeze Protection (Flowable at or below) | −50° C. | −50° C. |

TABLE 7

| Component | Wt. % | Wt. % |
|---|---|---|
| Water | 40-50 | 43-48 |
| Tolyltriazole (Corrosion inhibitor) | 0.01-0.1 | 0.01-0.1 |
| Dowicide A (antimicrobial) | 0.01-0.05 | 0.01-0.05 |
| Propylene glycol | 1-10 | 1-5 |
| Glycerin | 1-10 | 1-5 |
| Alkylpolyglycoside | 0.2-1.5 | 0.5-1 |
| Sodium Decyl Sulfate | 0.01-1 | 0.02-0.2 |
| Cocamidopropyl Hydroxysultaine | 0.1-1 | 0.2-0.8 |
| Ethoxylated acetylenic diol | 0.1-1 | 0.2-0.6 |
| Potassium acetate | 40-50 | 45-50 |
| TOTAL | 100 | 100 |

The exemplary aqueous firefighting composition formulations shown in Tables 1-7 can be used as aqueous firefighting compositions in onboard firefighting systems of valuable heavy industrial equipment, such as heavy vehicles and other types of heavy equipment used in construction, forestry, mining, and other industries, as used throughout the world. The exemplary aqueous firefighting compositions shown in Tables 1-7 are provided as use-strength compositions. The formulations shown in Tables 1-3 are typically flowable at temperatures down to at least about −30° C. and, in some instances, may be flowable at temperatures of down to about −35° C. The exemplary aqueous firefighting compositions shown in Tables 4-7 are typically flowable at temperatures down to −45° C. or below, and in some instances, may be flowable at temperatures below about −50° C. The fire extinguishing efficacy of the formulations shown in Tables 1-7 can be tested using the FM Approvals Standard 5970 and Australian Standard 5052, both of which are incorporated by reference herein in relevant part. The stability of the formulations shown in Tables 1-7 can be tested using the FM Approvals Standard 5970. For example, the aqueous firefighting compositions disclosed herein commonly remain as homogenous solutions when stored at temperatures of about −30° C. through about 60° C. More specifically, during testing, a first sample of 0.6 L of the aqueous firefighting composition is disposed in a first transparent closed container and stored at about 60° C. undisturbed for 90 days. A second sample of substantially 0.6 L of the aqueous firefighting composition is disposed in a second transparent closed container and stored at about −30° C. undisturbed for 90 days. The first sample and the second sample are examined for stratification at 30, 60, and 90 days. To pass the stability test, no separation or stratification is visible at 30, 60, and 90 days. Visible evidence of stratification includes the development of two or more distinct layers and/or the precipitation of any solids. Cloudiness or other changes in appearance without loss of homogeneity (e.g., without stratification and/or precipitation of solids) is acceptable if the samples produce the same results as unchanged samples when examined by FTIR and when the viscosity is measured.

The exemplary aqueous firefighting formulations shown in Tables 1-6 typically have a pH of about 7 to 11. The exemplary aqueous firefighting formulations shown in Tables 1-3 typically have a pH of about 9 to 11. Commonly, the formulations shown in Tables 1-3 have a pH of about 9.5 to 10.5. The exemplary aqueous firefighting formulations shown in Tables 4-7 typically have a pH of about 7 to 9. If necessary, a pH adjusting agent may be added to a composition to achieve the desired pH range.

The exemplary aqueous firefighting composition formulations described herein typically have a freezing point of no more than about −30° C. Commonly, formulations such as those shown in Tables 1-3 have a freezing point of no more than about −35° C. and, in some instances, have a freezing point of no more than about −40° C. Commonly, formulations such as those shown in Tables 4-7 have a freezing point of no more than about −45° C. and, in some instances, have a freezing point of no more than about −50° C.

The exemplary aqueous firefighting compositions formulations described herein typically have a Brookfield viscosity of no more than about 50 cP (measured at 60 rpm and at 2° C. using spindle #2). In some embodiments, such formulations may have a Brookfield viscosity of no more than about 20 cP (measured at 60 rpm and at 2° C. using spindle #2).

Method of Producing a Firefighting Foam

As described above, the exemplary aqueous firefighting composition formulations shown in Tables 1-7 can be used as aqueous firefighting compositions in onboard firefighting system of heavy industrial equipment, such as heavy vehicles and other types of heavy equipment used in construction, forestry, mining, and other industries, as used throughout the world. The exemplary aqueous firefighting compositions shown in Tables 1-7 are provided as use-strength compositions and can be deployed by an onboard firefighting system of the heavy industrial equipment to facilitate the protection of the heavy industrial equipment and/or an operator thereof from a fire.

Typically, the exemplary aqueous firefighting compositions described above are applied to the fire as a foam. In some embodiments, the onboard firefighting system of the valuable heavy industrial equipment can include a storage tank, a pump, a dispensing mechanism, and a piping system. The piping system is structured to fluidly couple the storage tank, the pump, and the dispensing mechanism. The storage tank is structured to store the aqueous firefighting composition. In some embodiments, the dispensing mechanism includes one or more nozzles. The one or more nozzles are structured to aerate the aqueous firefighting composition as the aqueous firefighting composition flows through the one or more nozzles. In response to determining a need to fight a fire (e.g., based on a command input by an operator, information indicative of a fire sensed by one or more sensors in wired or wireless communication with a control system of the onboard firefighting system, etc.), the pump is structured to pump the aqueous firefighting solution through the piping and the dispensing mechanism to produce a firefighting foam from the aqueous firefighting composition.

Method of Fighting a Fire

As described above, the exemplary aqueous firefighting composition formulations shown in Tables 1-6 can be used as aqueous firefighting compositions in onboard firefighting system of heavy industrial equipment, such as heavy vehicles and other types of heavy equipment used in construction, forestry, mining, and other industries, as used throughout the world. The exemplary aqueous firefighting compositions shown in Tables 1-6 are provided as use-strength compositions and can be deployed by an onboard firefighting system of the valuable heavy industrial equipment to protect the valuable heavy industrial equipment and/or an operator thereof from a fire. In some embodiments, the onboard firefighting system is substantially the same as the onboard firefighting system described above.

An exemplary method of fighting a fire with any of the aqueous firefighting compositions described herein includes applying the aqueous firefighting composition to the fire. The method of fighting the fire includes flowing the aqueous firefighting composition from the storage tank of the onboard industrial equipment firefighting system to the dispensing mechanism of the onboard industrial equipment firefighting system. In some embodiments, the dispensing mechanism is one or more nozzles. In some embodiments, the method includes applying the aqueous firefighting composition at a temperature below about −10° C. to the fire. In some embodiments, the method includes applying the aqueous firefighting composition at a temperature below about −20° C. to the fire. In some embodiments, the method includes applying the aqueous firefighting composition at a temperature at or below about −30° C. to the fire. In some embodiments, the method includes applying the aqueous firefighting composition at a temperature at or below about −40° C. to the fire. In some embodiments, the method includes applying the aqueous firefighting composition at a temperature at or below about −50° C. to the fire.

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

One embodiment relates to an aqueous firefighting composition that includes a) about 20-40 wt. % of a sodium and/or potassium salt of an organic acid, b) one or more of an alkylpolyglycoside surfactant, an alkyl sulfate anionic surfactant, an alkyliminodialkyl-carboxylate surfactant and an alkylamidoalkylene zwitterionic surfactant, c) an acetylenic diol derivative surfactant and/or a siloxane-based surfactant, d) about 5-20 wt. % alkylene glycol and/or glycerol, and e) at least about 30 wt. % water. In some embodiments, such a composition may be substantially free of any fluorinated additives.

In some embodiments of the aqueous firefighting composition described above, the acetylenic diol derivative surfactant includes an alkoxylated acetylenic diol. In some embodiments, the alkoxylated acetylenic diol includes an ethoxylated acetylenic diol and/or an ethylene oxide-propylene oxide copolymer diether of an acetylenic diol. In some embodiments, the alkoxylated acetylenic diol includes ethoxylated 2,5,8,11-tetramethyl-6-dodecyn-5,8 diol and/or ethoxylated 2,4,7,9-tetramethyl-5-decyne-4,7-diol. In some embodiments, the acetylenic diol derivative surfactant includes an alkoxylated 2,5,8,11-tetramethyl-6-dodecyn-5,8 diol. In some embodiments, the acetylenic diol derivative surfactant includes an alkoxylated 2,4,7,9-tetramethyl-5-decyne-4,7-diol.

In some embodiments of the aqueous firefighting composition described above, the sodium and/or potassium salt of the organic acid includes potassium acetate, potassium formate, potassium propionate, potassium butyrate, potassium lactate, potassium citrate, sodium acetate, sodium lactate, sodium oxalate, potassium oxalate, sodium citrate, potassium tartrate, sodium tartrate, potassium bitartrate, sodium bitartrate or a mixture of two or more thereof. In some embodiments, the sodium and/or potassium salt of the organic acid includes potassium acetate, potassium formate, potassium lactate or a mixture of two or more thereof.

In some embodiments of the aqueous firefighting composition described above, the alkylamidoalkylene zwitterionic surfactant includes an alkylamidoalkylene hydroxysultaine surfactant. In some embodiments, the alkylamidoalkylene hydroxysultaine surfactant includes a $C_{8-18}$-alkylamidopropyl hydroxysultaine surfactant.

In some embodiments of the aqueous firefighting composition described above, the alkylamidoalkylene zwitterionic surfactant includes an alkylamidoalkylene betaine surfactant. In some embodiments, the alkylamidoalkylene betaine surfactant includes a $C_{8-18}$-alkylamidoalkyl betaine surfactant.

In some embodiments of the aqueous firefighting composition described above, the composition includes alkylene glycol and glycerol in a weight ratio of about 0.1:1 to 5:1. In some embodiments, the alkylene glycol includes propylene glycol and/or ethylene glycol. In some embodiments, the alkylene glycol includes propylene glycol. In some embodiments, the composition includes a mixture of propylene glycol and glycerol. In some embodiments, the alkylene glycol includes ethylene glycol. In some embodiments, the composition includes a mixture of ethylene glycol and glycerol.

Another embodiment relates to an aqueous firefighting composition including a) about 25-30 wt. % potassium acetate, b) about 0.5-5 wt. % of a surfactant mixture comprising alkylpolyglycoside, $C_{8-12}$-alkyl sulfate salt, $C_{10-14}$-alkyliminodipropionate salt, $C_{8-18}$-alkylamidopropyl hydroxysultaine zwitterionic surfactant and ethoxylated acetylenic diol surfactant, c) about 8-20 wt. % of a solvent mixture comprising (1) glycerol and (2) ethylene glycol and/or propylene glycol, and e) at least about 30 wt. % water. In some embodiments, such an aqueous firefighting composition may be substantially free of any fluorinated additives. In some embodiments, the composition may have a total concentration of fluorine atoms on a weight percentage basis of no more than about 1 ppm F.

In some embodiments of the aqueous firefighting composition described immediately above, the ethoxylated acetylenic diol surfactant includes ethoxylated 2,5,8,11-tetramethyl-6-dodecyn-5,8 diol and/or ethoxylated 2,4,7,9-tetramethyl-5-decyne-4,7-diol.

In some embodiments of the aqueous firefighting composition described immediately above, the alkylpolyglycoside includes $C_{8-12}$-alkylpolyglycoside.

In some embodiments of the aqueous firefighting composition described immediately above, the $C_{8-12}$-alkyl sulfate salt includes sodium decyl sulfate.

In some embodiments of the aqueous firefighting composition described immediately above, the $C_{10-14}$-alkyliminodipropionate salt includes a lauryliminodipropionate sodium salt.

In some embodiments of the aqueous firefighting composition described immediately above, the $C_{8-18}$-alkylamidopropyl hydroxysultaine zwitterionic surfactant includes cocamidopropyl hydroxysultaine.

In some embodiments of the aqueous firefighting composition described immediately above, the composition includes ethylene glycol and/or propylene glycol and glycerol in a weight ratio of about 0.1:1 to 5:1.

In some embodiments of the aqueous firefighting composition described immediately above, the composition comprises alkylene glycol and glycerol in a weight ratio of about 0.3:1 to 3:1.

Another embodiment relates to an aqueous firefighting composition including a) about 25-30 wt. % of a potassium acetate, b) about 0.5-5 wt. % of a surfactant mixture comprising alkylpolyglycoside, $C_{8-12}$-alkyl sulfate salt, $C_{10-14}$-alkyliminodipropionate salt, $C_{10-18}$-alkylamidopropyl hydroxysultaine zwitterionic surfactant and siloxane-based surfactant, c) about 8-20 wt. % of a solvent mixture comprising (1) glycerol and (2) ethylene glycol and/or propylene glycol, and e) at least about 40 wt. % water. Such compositions may be substantially free of any fluorinated additives. In some embodiments, the composition may have a total concentration of fluorine atoms on a weight percentage basis of no more than about 1 ppm F.

In some embodiments, the siloxane-based surfactant includes a polyether siloxane.

In some embodiments, the alkylpolyglycoside includes $C_{8-12}$-alkylpolyglycoside.

In some embodiments, the $C_{8-12}$-alkyl sulfate salt includes sodium decyl sulfate.

In some embodiments of the aqueous firefighting composition described immediately above, the $C_{10-14}$-alkyliminodipropionate salt includes a lauryliminodipropionate sodium salt.

In some embodiments of the aqueous firefighting composition described immediately above, the $C_{8-18}$-alkylamidopropyl hydroxysultaine zwitterionic surfactant includes cocamidopropyl hydroxysultaine.

In some embodiments of the aqueous firefighting composition described immediately above, the composition includes ethylene glycol and/or propylene glycol and glycerol in a weight ratio of about 0.1:1 to 5:1.

Another embodiment relates to an aqueous firefighting composition including a) about 25-30 wt. % of a potassium acetate, b) about 0.2 to 3 wt. % $C_{8-12}$-alkylpolyglycoside, c) about 0.05 to 1 wt. % lauryliminodipropionate salt, d) about 0.05 to 1 wt. % $C_{8-12}$-alkyl sulfate salt, e) about 0.05 to 1 wt. % $C_{8-18}$-alkylamidopropyl hydroxysultaine zwitterionic surfactant, f) about 0.1 to 2 wt. % ethoxylated acetylenic diol surfactant, g) about 8-20 wt. % of a mixture of glycerol and propylene glycol, wherein the weight ratio of glycerol to propylene glycol is about 0.3:1 to 3:1, and h) at least about 40 wt. % water. The composition typically contains no more than 0.01 wt. % fluorinated surfactant(s). Such compositions may be substantially free of any fluorinated additives. In some embodiments, the composition may have a total concentration of fluorine atoms on a weight percentage basis of no more than about 1 ppm F.

In some embodiments of the aqueous firefighting composition described immediately above, the ethoxylated acetylenic diol includes ethoxylated 2,5,8,11-tetramethyl-6-dodecyn-5,8 diol and/or ethoxylated 2,4,7,9-tetramethyl-5-decyne-4,7-diol.

In some embodiments of the aqueous firefighting composition described immediately above, the alkylpolyglycoside includes $C_{8-12}$-alkylpolyglycoside.

In some embodiments of the aqueous firefighting composition described immediately above, the $C_{8-12}$-alkyl sulfate salt includes sodium decyl sulfate.

In some embodiments of the aqueous firefighting composition described immediately above, the $C_{10-14}$-alkyliminodipropionate salt includes a lauryliminodipropionate sodium salt.

In some embodiments of the aqueous firefighting composition described immediately above, the $C_{8-18}$-alkylamidopropyl hydroxysultaine zwitterionic surfactant comprises cocamidopropyl hydroxysultaine.

Another embodiment relates to an aqueous firefighting composition including a) about 25-30 wt. % of a potassium acetate, b) about 0.2 to 3 wt. % $C_{8-12}$-alkylpolyglycoside, c) about 0.05 to 1 wt. % lauryliminodipropionate salt, d) about 0.05 to 1 wt. % $C_{8-12}$-alkyl sulfate salt, e) about 0.05 to 1 wt. % $C_{8-18}$-alkylamidopropyl hydroxysultaine zwitterionic surfactant, f) about 0.1 to 2 wt. % siloxane-based surfactant, g) about 8-20 wt. % of a mixture of glycerol and propylene glycol. The weight ratio of glycerol to propylene glycol is about 0.3:1 to 3:1. The composition further includes h) at least about 40 wt. % water. The composition typically contains no more than 0.01 wt. % fluorinated surfactant(s). Such compositions may be substantially free of any fluorinated additives. In some embodiments, the composition may have a total concentration of fluorine atoms on a weight percentage basis of no more than about 1 ppm F.

In some embodiments of the aqueous firefighting composition described immediately above, the siloxane-based surfactant includes a polyether siloxane.

In some embodiments of the aqueous firefighting composition described immediately above, the alkylpolyglycoside includes $C_{8-12}$-alkylpolyglycoside.

In some embodiments of the aqueous firefighting composition described immediately above, the $C_{8-12}$-alkyl sulfate salt includes sodium decyl sulfate.

In some embodiments of the aqueous firefighting composition described immediately above, the $C_{10-14}$-alkyliminodipropionate salt includes a lauryliminodipropionate sodium salt.

In some embodiments of the aqueous firefighting composition described immediately above, the $C_{8-18}$-alkylamidopropyl hydroxysultaine zwitterionic surfactant comprises cocamidopropyl hydroxysultaine.

Another embodiment relates to an aqueous firefighting composition including a) about 25-30 wt. % potassium acetate, b) about 0.5-5 wt. % of a surfactant mixture comprising alkylpolyglycoside, $C_{8-12}$-alkyl sulfate salt, $C_{10-14}$-alkyliminodipropionate salt, $C_{8-18}$-alkylamidopropyl hydroxysultaine zwitterionic surfactant and siloxane-based surfactant, c) about 8-20 wt. % of a solvent mixture comprising (1) glycerol and (2) ethylene glycol and/or propylene glycol, and e) at least about 30 wt. % water. The composition typically contains no more than 0.01 wt. % fluorinated surfactant(s). Such compositions may be substantially free of any fluorinated additives. In some embodiments, the composition may have a total concentration of fluorine atoms on a weight percentage basis of no more than about 1 ppm F.

In any of the exemplary aqueous firefighting compositions described above, the composition may have a total concentration of fluorine atoms on a weight percentage basis of no more than about 1 ppm F.

In any of the exemplary aqueous firefighting compositions described above, the composition commonly has a pH of about 9 to 11. In some embodiments, the composition has a pH of about 9.5 to 10.5.

In any of the exemplary aqueous firefighting compositions described above, the composition may desirably have a freezing point of no more than about −30° C. In some of the exemplary aqueous firefighting compositions described above, the composition may have a freezing point of no more than about −35° C. In some of the exemplary aqueous firefighting compositions described above, the composition may have a freezing point of no more than about −40° C.

In any of the exemplary aqueous firefighting compositions described above, the composition may have a Brookfield viscosity at 2° C. of no more than about 50 cP (measured at 60 rpm using spindle #2). In some of the exemplary aqueous firefighting compositions described above, the composition may have a Brookfield viscosity at 2° C. of no more than about 20 cP (measured at 60 rpm using spindle #2).

A method of producing a firefighting foam includes aerating any of the aqueous firefighting compositions described above.

A method of fighting a fire includes applying any of the aqueous firefighting compositions described above to the fire.

In some embodiments, the method of fighting the fire described immediately above includes flowing the aqueous firefighting composition from a storage tank of an onboard industrial equipment firefighting system to a dispensing mechanism. In some embodiments, the dispensing mechanism is a nozzle. In some embodiments, the onboard industrial equipment firefighting system is an onboard industrial vehicle firefighting system.

In some embodiments, either of the methods described above include applying any of the aqueous firefighting compositions described above at a temperature below about −10° C. to the fire.

In some embodiments, either of the methods described above include applying any of the aqueous firefighting compositions described above at a temperature below about −20° C. to the fire.

In some embodiments, either of the methods described above include applying any of the aqueous firefighting compositions described above at a temperature below about −30° C. to the fire.

One embodiment relates to an aqueous firefighting composition including a) about 20-50 wt. % of a sodium and/or potassium salt of an organic acid, b) a surfactant mixture containing one or more of an alkylpolyglycoside surfactant, an alkyl sulfate anionic surfactant, an alkyliminodialkylcarboxylate surfactant and a zwitterionic surfactant, c) an acetylenic diol derivative surfactant and/or a siloxane-based surfactant, d) about 5-25 wt. % alkylene glycol and/or glycerol, and e) at least about 40 wt. % water.

In some embodiments, the acetylenic diol derivative surfactant comprises an alkoxylated acetylenic diol.

In some embodiments, the alkoxylated acetylenic diol comprises ethoxylated 2,5,8,11-tetramethyl-6-dodecyn-5,8 diol and/or ethoxylated 2,4,7,9-tetramethyl-5-decyne-4,7-diol.

In some embodiments, the siloxane-based surfactant comprises a polyether siloxane.

In some embodiments, the sodium and/or potassium salt of the organic acid comprises potassium acetate, potassium formate, potassium lactate or a mixture of two or more thereof.

In some embodiments, the zwitterionic surfactant comprises one or more of an alkylamidopropyl hydroxysultaine surfactant, an alkylamidoalkyl betaine surfactant, and an alkyl betaine surfactant.

In some embodiments, the surfactant mixture comprises one or more surfactants selected from $C_{8-12}$-alkylpolyglycosides, $C_{12-20}$-alkyl sulfate salts, $C_{10-14}$-alkyliminodipropionate salts, $C_{8-18}$-alkylamidopropyl hydroxysultaine surfactants, $C_{8-18}$-alkylamidoalkyl betaine surfactants, $C_{8-18}$-alkyl betaine surfactants and $C_{8-12}$-alkylpolyglycosides.

In some embodiments, the aqueous firefighting composition comprises the alkylene glycol and glycerol in a weight ratio of about 0.1:1 to 5:1.

In some embodiments, the aqueous firefighting composition includes a) about 25-35 wt. % potassium acetate, potassium formate, potassium lactate or a mixture of two or more thereof, b) about 0.5-5 wt. % of the surfactant mixture, which comprises $C_{8-12}$ alkylpolyglycoside, $C_{8-12}$-alkyl sulfate salt, $C_{10-14}$-alkyliminodipropionate salt, and $C_{8-18}$-alkylamidopropyl hydroxysultaine surfactant, c) ethoxylated acetylenic diol surfactant, d) about 8-20 wt. % of a mixture of (1) glycerol and (2) ethylene glycol and/or propylene glycol, and e) at least about 50 wt. % water.

In some embodiments, the aqueous firefighting composition includes a) about 25-35 wt. % potassium acetate, potassium formate, potassium lactate or a mixture of two or more thereof, b) about 0.5-5 wt. % of the surfactant mixture, which comprises $C_{8-12}$ alkylpolyglycoside, $C_{8-12}$-alkyl sulfate salt, and $C_{8-18}$-alkylamidopropyl hydroxysultaine surfactant, c) about 0.1-1 wt. % of the ethoxylated acetylenic diol surfactant, d) about 10-25 wt. % of a mixture of (1) glycerol and (2) ethylene glycol and/or propylene glycol, and e) at least about 45 wt. % water.

In some embodiments, the aqueous firefighting composition is substantially free of any fluorinated additives.

In some embodiments, the aqueous firefighting composition has a total concentration of fluorine atoms on a weight percentage basis of no more than about 1 ppm F.

In some embodiments, the aqueous firefighting composition includes a) about 25-30 wt. % of a potassium acetate, b) about 0.2 to 3 wt. % $C_{8-12}$-alkylpolyglycoside, c) about 0.05 to 1 wt. % lauryliminodipropionate salt, d) about 0.05 to 1 wt. % $C_{8-12}$-alkyl sulfate salt, e) about 0.05 to 1 wt. % $C_{8-18}$-alkylamidopropyl hydroxysultaine surfactant, f) about 0.1 to 2 wt. % ethoxylated acetylenic diol surfactant, g) about 8-20 wt. % of a mixture of glycerol and propylene glycol, wherein the weight ratio of glycerol to propylene glycol is about 0.1:1 to 5:1, and h) at least about 50 wt. % water. The composition contains no more than 0.01 wt. % fluorinated surfactant.

In some embodiments, the aqueous firefighting composition includes a) about 27-35 wt. % of a potassium acetate, b) about 0.5 to 1.5 wt. % $C_{8-12}$-alkylpolyglycoside, c) about 0.05 to 1 wt. % $C_{8-12}$-alkyl sulfate salt, d) about 0.2 to 1 wt. % $C_{8-18}$-alkylamidopropyl hydroxysultaine surfactant, e) about 0.1 to 1 wt. % ethoxylated acetylenic diol surfactant, f) about 10-25 wt. % of a mixture of glycerol and propylene glycol, wherein the weight ratio of glycerol to propylene glycol is about 0.1:1 to 5:1, and g) about 45 to 55 wt. % water. The composition contains no more than 0.01 wt. % fluorinated surfactant.

In some embodiments, the aqueous firefighting composition has a pH of about 7 to 11.

In some embodiments, the aqueous firefighting composition has a freezing point of no more than about −30° C.

In some embodiments, the aqueous firefighting composition has a freezing point of no more than about −45° C.

In some embodiments, the aqueous firefighting composition includes a) about 25-35 wt. % potassium acetate, potassium lactate, and/or potassium formate, b) about 0.5-5 wt. % of a surfactant mixture containing $C_{8-12}$ alkylpolyglycoside, $C_{8-12}$-alkyl sulfate salt and $C_{8-18}$-alkylamidopropyl hydroxysultaine surfactant, c) about 0.1-1 wt. % ethoxylated acetylenic diol surfactant, d) about 10-25 wt. % of a mixture of glycerol and propylene glycol, and e) about 45-55 wt. % water.

In some embodiments, the aqueous firefighting composition includes a) about 27-35 wt. % potassium acetate, b) about 0.5 to 1.5 wt. % $C_{8-10}$-alkylpolyglycoside, c) about 0.05 to 1 wt. % $C_{8-12}$-alkyl sulfate salt, d) about 0.2 to 1 wt. % cocamidopropyl hydroxysultaine surfactant, e) about 0.1 to 1 wt. % ethoxylated acetylenic diol surfactant, f) about 10-20 wt. % of a mixture of glycerol and propylene glycol, wherein the weight ratio of glycerol to propylene glycol is about 0.3:1 to 3:1, and g) about 45 to 55 wt. % water. The composition has a pH of about 7 to 11 and a freezing point of no more than about −45° C.

In some embodiments, the aqueous firefighting composition of claim 1, wherein the composition includes a) about 40-50 wt. % potassium acetate, potassium lactate, and/or potassium formate, b) about 0.5-5 wt. % of a surfactant mixture containing $C_{8-12}$-alkylpolyglycoside, $C_{8-12}$-alkyl sulfate salt and $C_{8-18}$-alkylamidopropyl hydroxysultaine surfactant, c) about 0.1-1 wt. % ethoxylated acetylenic diol surfactant, d) about 2-10 wt. % of a mixture of glycerol and propylene glycol; and e) about 40-50 wt. % water.

In some embodiments, a method of producing a firefighting foam includes aerating any of the aqueous firefighting compositions described herein.

In some embodiments, a method of fighting a fire includes applying any of the aqueous firefighting compositions described herein to the fire.

In some embodiments, the method of fighting a fire includes flowing any of the aqueous firefighting compositions described herein from a storage tank of an onboard industrial equipment firefighting system to a dispensing mechanism.

While certain embodiments have been illustrated and described, it should be understood that changes and modifications can be made therein in accordance with ordinary skill in the art without departing from the technology in its broader aspects.

The embodiments illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expression of excluding any equivalents of the features shown and described or potions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Additionally, where features or aspects of the disclosure are described in terms of Markush groups, those skilled in the art will realize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. An aqueous firefighting composition comprising:
- about 20-50 wt. % of a sodium and/or potassium salt of an organic acid;
- a surfactant mixture containing an alkylpolyglycoside surfactant, an alkyl sulfate anionic surfactant, an alkyliminodialkylcarboxylate surfactant, a zwitterionic surfactant, or a mixture of any two or more thereof;
- an alkoxylated acetylenic diol surfactant, an acetylenic diol derivative surfactant, a siloxane-based surfactant, or a mixture of any two or more thereof;
- about 2-25 wt. % a mixture of an alkylene glycol and glycerol in a weight ratio of about 0.1:1 to 5:1;
- a corrosion inhibitor; and
- at least about 40 wt. % water.

2. The aqueous firefighting composition of claim 1, wherein the alkoxylated acetylenic diol comprises ethoxylated 2,5,8,11-tetramethyl-6-dodecyn-5,8 diol and/or ethoxylated 2,4,7,9-tetramethyl-5-decyne-4,7-diol.

3. The aqueous firefighting composition of claim 1, wherein the sodium and/or potassium salt of the organic acid comprises potassium acetate, potassium formate, potassium lactate or a mixture of two or more thereof.

4. The aqueous firefighting composition of claim 1, wherein the zwitterionic surfactant comprises one or more of an alkylamidopropyl hydroxysultaine surfactant, an alkylamidoalkyl betaine surfactant, and an alkyl betaine surfactant.

5. The aqueous firefighting composition of claim 1, wherein the surfactant mixture comprises one or more surfactants selected from $C_{8-12}$-alkylpolyglycosides, $C_{12-20}$-alkyl sulfate salts, $C_{10-14}$-alkyliminodipropionate salts, $C_{8-18}$-alkylamidopropyl hydroxysultaine surfactants, $C_{8-18}$-alkylamidoalkyl betaine surfactants, $C_{8-18}$-alkyl betaine surfactants and $C_{8-12}$-alkylpolyglycosides.

6. The aqueous firefighting composition of claim 1, comprising:
- about 25-35 wt. % potassium acetate, potassium formate, potassium lactate or a mixture of two or more thereof;
- about 0.5-5 wt. % of the surfactant mixture, which comprises $C_{8-12}$ alkylpolyglycoside, $C_{8-12}$-alkyl sulfate salt, $C_{10-14}$-alkyliminodipropionate salt, and $C_{8-18}$-alkylamidopropyl hydroxysultaine surfactant;
- ethoxylated acetylenic diol surfactant;
- about 8-20 wt. % of a mixture of (1) glycerol and (2) ethylene glycol, propylene glycol, or a mixture of ethylene glycol and propylene glycol; and
- at least about 50 wt. % water.

7. The aqueous firefighting composition of claim 1, comprising:
- about 25-35 wt. % potassium acetate, potassium formate, potassium lactate or a mixture of two or more thereof;
- about 0.5-5 wt. % of the surfactant mixture, which comprises $C_{8-12}$ alkylpolyglycoside, $C_{8-12}$-alkyl sulfate salt, and $C_{8-18}$-alkylamidopropyl hydroxysultaine surfactant;
- about 0.1-1 wt. % of the ethoxylated acetylenic diol surfactant;
- about 10-25 wt. % of a mixture of (1) glycerol and (2) ethylene glycol, propylene glycol, or a mixture of ethylene glycol and propylene glycol; and
- at least about 45 wt. % water.

8. The aqueous firefighting composition of claim 1, wherein the composition is substantially free of any fluorinated additives.

9. The aqueous firefighting composition of claim 1, wherein the composition has a total concentration of fluorine atoms on a weight percentage basis of no more than about 1 ppm F.

10. The aqueous firefighting composition of claim 1, comprising:
- about 25-30 wt. % of a potassium acetate;
- about 0.2 to 3 wt. % $C_{8-12}$-alkylpolyglycoside;
- about 0.05 to 1 wt. % lauryliminodipropionate salt;
- about 0.05 to 1 wt. % $C_{8-12}$-alkyl sulfate salt;
- about 0.05 to 1 wt. % $C_{8-18}$-alkylamidopropyl hydroxysultaine surfactant;
- about 0.1 to 2 wt. % ethoxylated acetylenic diol surfactant;
- about 8-20 wt. % of a mixture of glycerol and propylene glycol; and
- at least about 50 wt. % water;
- wherein the composition contains no more than 0.01 wt. % fluorinated surfactant.

11. The aqueous firefighting composition of claim 1, comprising:
- about 27-35 wt. % of a potassium acetate;
- about 0.5 to 1.5 wt. % $C_{8-12}$-alkylpolyglycoside;
- about 0.05 to 1 wt. % $C_{8-12}$-alkyl sulfate salt;
- about 0.2 to 1 wt. % $C_{8-18}$-alkylamidopropyl hydroxysultaine surfactant;
- about 0.1 to 1 wt. % ethoxylated acetylenic diol surfactant;
- about 10-25 wt. % of a mixture of glycerol and propylene glycol; and
- about 45 to 55 wt. % water;
- wherein the composition contains no more than 0.01 wt. % fluorinated surfactant.

12. The aqueous firefighting composition of claim 1, wherein the composition has a pH of about 7 to 11.

13. The aqueous firefighting composition of claim 1, wherein the composition has a freezing point of no more than about −30° C.

14. The aqueous firefighting composition of claim 1, wherein the composition has a freezing point of no more than about −45° C.

15. The aqueous firefighting composition of claim 1, wherein the corrosion inhibitor comprises tolyltriazole.

16. The aqueous firefighting composition of claim 15, wherein the composition comprises:

about 25-35 wt. % potassium acetate, potassium lactate, and/or potassium formate;

about 0.5-5 wt. % of a surfactant mixture containing $C_{8-12}$ alkylpolyglycoside, $C_{8-12}$-alkyl sulfate salt and $C_{8-18}$-alkylamidopropyl hydroxysultaine surfactant;

about 0.1-1 wt. % ethoxylated acetylenic diol surfactant;

about 10-25 wt. % of a mixture of glycerol and propylene glycol; and about 45-55 wt. % water.

17. A method of producing a firefighting foam comprising aerating the aqueous firefighting composition of claim 1.

18. A method of fighting a fire comprising applying the aqueous firefighting composition of claim 1 to the fire.

19. The method of claim 18, wherein the method comprises flowing the aqueous firefighting composition from a storage tank of an onboard industrial equipment firefighting system to a dispensing mechanism.

* * * * *